(12) United States Patent
Naranjo et al.

(10) Patent No.: US 8,396,181 B2
(45) Date of Patent: *Mar. 12, 2013

(54) METHOD AND APPARATUS FOR GENERATING NUCLEAR FUSION USING CRYSTALLINE MATERIALS

(75) Inventors: Brian Naranjo, Fullerton, CA (US); James Gimzewski, Santa Monica, CA (US); Seth Putterman, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/745,556

(22) Filed: May 8, 2007

(65) Prior Publication Data

US 2008/0142717 A1    Jun. 19, 2008

Related U.S. Application Data (63) Continuation of application No. PCT/US2006/000113, filed on Jan. 3, 2006.

(60) Provisional application No. 60/641,302, filed on Jan. 3, 2005.

(51) Int. Cl.
*G21G 4/02* (2006.01)

(52) U.S. Cl. ........................ 376/114; 376/100

(58) Field of Classification Search .................. 376/114
See application file for complete search history.

(56) References Cited

U.S. PATENT DOCUMENTS

| | | | | |
|---|---|---|---|---|
| 3,840,748 | A * | 10/1974 | Braunlich | 378/122 |
| 3,924,137 | A * | 12/1975 | Alger | 376/151 |
| 3,969,279 | A * | 7/1976 | Kern | 252/518.1 |
| 5,518,595 | A * | 5/1996 | Yamakage | 204/192.34 |
| 7,741,615 | B2 * | 6/2010 | Putterman et al. | 250/424 |
| 2004/0239225 | A1 * | 12/2004 | Venugopal et al. | 313/311 |
| 2004/0239229 | A1 * | 12/2004 | Venugopal et al. | 313/346 R |
| 2007/0202673 | A1 * | 8/2007 | Kim et al. | 438/580 |
| 2008/0251735 | A1 * | 10/2008 | Putterman et al. | 250/424 |

OTHER PUBLICATIONS

Geuther, et al, "Electron and positive ion acceleration with pyroelectric crystals", Journal of AppliedPhysics 97, 074109 (5 pp.) (2005).*

Krasik et al, IEEE Transactions on Plasma Science, vol. 31, No. 1, pp. 49-59 (2003).*

Geuther et al, "Electron Acceleration for X-ray Production Using Paired Pyroelectric Crystals", 6th International Meeting on Nuclear Applications of Accelerator Technology (AccApp'03), full article pp. 591-595.*

Geuther et al., "Pyroelectric Electron Acceleration: Improvements and Future Applications", American Nuclear Society vol. 91, Nov. 2004, pp. 885-886, DOE NEER: Highlights of Recent and Current research—I.*

Dougar Jabon et al., "Catalitically Induced D-D Fusion in Ferroelectrics", Brazilian Journal of Physics 27(4), pp. 515-521, Dec. 1997.*

Uttley, C.A., "Sources of Monoenergetic Neutrons", Chapter III in "Neutron Sources for Basic Physics and Applications", Editor S. Cierjacks, Pergamon Press, 1983.*

(Continued)

*Primary Examiner* — Johannes P Mondt
(74) *Attorney, Agent, or Firm* — John P. O'Banion (57) ABSTRACT

Gently heating a pyroelectric crystal in a deuterated atmosphere can generate fusion under desktop conditions. The electrostatic field of the crystal is used to generate and accelerate a deuteron beam (>100 keV and >4 nA), which, upon striking a deuterated target, produces a neutron flux over 400 times the background level. The presence of neutrons within the target is confirmed by pulse shape analysis and proton recoil spectroscopy. Several elements of the system may be modified, including the configuration of the crystal or crystals, the composition of the surrounding environment and the target, the use of multiple probe tips, and the composition of the probe tip.

10 Claims, 7 Drawing Sheets

OTHER PUBLICATIONS

Abstract and source and date information on Geuther et al, "Pyroelectric electron acceleration: improvements and future applications", Transactions of the American Nuclear Society, vol. 91, pp. 885-886 (2004).*

Website http://homepages.rpi.edu/~danony/Research/Pyro.htm containing under Publications' reference to Geuther et al, "Electron Acceleration for X-ray Production using Paired Pyroelectric Crystals", 6$^{th}$ Int. Meeting on Nuclear Applications of Accelerator Technology (AccApp'03), from which Geutehr et al listed above as item U on p. 1 was retrieved.*

Naranjo et al, "Observation of nuclear fusion driven by a pyroelectric crystal", Nature, vol. 343, Apr. 28, 2005.*

Rose and Clark, "Plasmas and Controlled Fusion", M.I.T. Press 1961, pp. 18-19.*

J.D. Lawson. Some criteria for a power producing thermonuclear reactor. Proc. Phys. Soc. B70, pp. 6-10 (1957).

* cited by examiner

METHOD AND APPARATUS FOR GENERATING NUCLEAR FUSION USING CRYSTALLINE MATERIALS

CROSS-REFERENCE TO RELATED APPLICATIONS

This application priority from, and is a 35 U.S.C. §111(a) continuation of, co-pending PCT international application serial number PCT/US2006/000113, filed on Jan. 3, 2006, incorporated herein by reference in its entirety, which claims priority from U.S. provisional application Ser. No. 60/641,302, filed on Jan. 3, 2005, incorporated herein by reference in its entirety.

STATEMENT REGARDING FEDERALLY SPONSORED RESEARCH OR DEVELOPMENT

This invention was made with Government support under Grant No. DMR 0309886, awarded by the National Science Foundation and Grant Nos. N00014-03-1-07 and N00014-04-1-07, awarded by the Department of Defense. The Government has certain rights in this invention.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to fusion research, and more particularly to the use of a pyroelectric crystal in a deuterated atmosphere to generate fusion under desktop conditions.

2. Description of Related Art

While progress in fusion research continues with magnetic and inertial confinement, alternative approaches—such as Coulomb explosions of deuterium clusters and ultrafast laser-plasma interactions—also provide insight into basic processes and technological applications. However, attempts to produce fusion in a room temperature solid-state setting, including "cold" fusion and "bubble" fusion, have met with deep skepticism.

BRIEF SUMMARY OF THE INVENTION

Gently heating a pyroelectric crystal in a deuterated atmosphere can generate fusion under desktop conditions. The electrostatic field of the crystal is used to generate and accelerate a deuteron beam (>100 keV and >4 nA), which, upon striking a deuterated target, produces a neutron flux over 400 times the background level. The presence of neutrons in the target is confirmed by pulse shape analysis and proton recoil spectroscopy. The applicable reaction is $D+D \rightarrow {}^3He$ (820 keV)+n (2.45 MeV).

An aspect of the invention is a method, comprising positioning a probe tip adjacent a crystal, and using the probe tip to produce field ionization of a neutron source; wherein the ionization results in production of neutron flux; and wherein the crystal is a pyroelectric or piezoelectric crystal.

One embodiment further comprises heating the crystal, wherein the crystal is a pyroelectric crystal. In another embodiment, the pyroelectric crystal comprises lithium tantalite.

Another embodiment further comprises providing a deuterated or tritiated target in a position of a trajectory defined by the probe tip. In another embodiment, the target comprises erbium dideuteride.

Another embodiment further comprises providing a target in a position of a trajectory defined by the probe tip, wherein the target comprises a neutron source.

In other embodiments, the crystal is ruptured, compressed, or exploded; the crystal comprises a matrix or mosaic of crystals; the crystal comprises a laminated crystal; or the probe tip is one of a plurality of tips adjacent the crystal.

Another aspect of the invention is a method, comprising locating a probe tip adjacent a pyroelectric crystal, heating the pyroelectric crystal in an environment containing a gaseous source of neutrons, wherein heating the pyroelectric crystal produces a beam about the probe tip, and positioning a target in a trajectory of the beam, wherein contact between the beam and the target produces a neutron flux. In other embodiments, the pyroelectric crystal comprises lithium tantalite, or the target comprises erbium dideuteride.

A still further aspect of the invention is an apparatus, comprising: a chamber, means for securing a pyroelectric crystal in the chamber, means for positioning a probe tip adjacent the pyroelectric crystal; and means for positioning a target comprising a neutron source. One embodiment further comprises means for heating said pyroelectric crystal.

In other embodiments, the chamber is configured to contain an atmosphere comprising a neutron source; the pyroelectric crystal comprises lithium tantalite; or the target comprises erbium dideuteride.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1A through FIG. 4C. It will be appreciated that the apparatus may vary as to configuration and as to details of the parts, and that the method may vary as to the specific steps and sequence, without departing from the basic concepts as disclosed herein.

Because its spontaneous polarization is a function of temperature, heating or cooling a pyroelectric crystal in vacuum causes bound charge to accumulate on faces normal to the polarization. A modest change in temperature can lead to a surprisingly large electrostatic field. For example, heating a lithium tantalate crystal from 240 K to 265 K decreases its spontaneous polarization by 0.0037 $Cm^{-2}$. In the absence of spurious discharges, introducing this magnitude of surface charge density into the particular geometry of our experiment (FIG. 1A, 1B) gives a potential of 100 kV. Attempts to harness this potential have focused on electron acceleration and the accompanying bremsstrahlung radiation, but using the crystal to produce and accelerate ions has been studied much less. Seeking to drive the D-D fusion reaction, we set out to develop a method of reliably producing an ion beam of sufficient energy (>80 keV) and current (>1 nA). We demonstrate such a method using a tungsten tip to generate the high field (>25 V $nm^{-1}$) necessary for gas phase field ionization of deuterium.

EXAMPLE

Figure 1A:
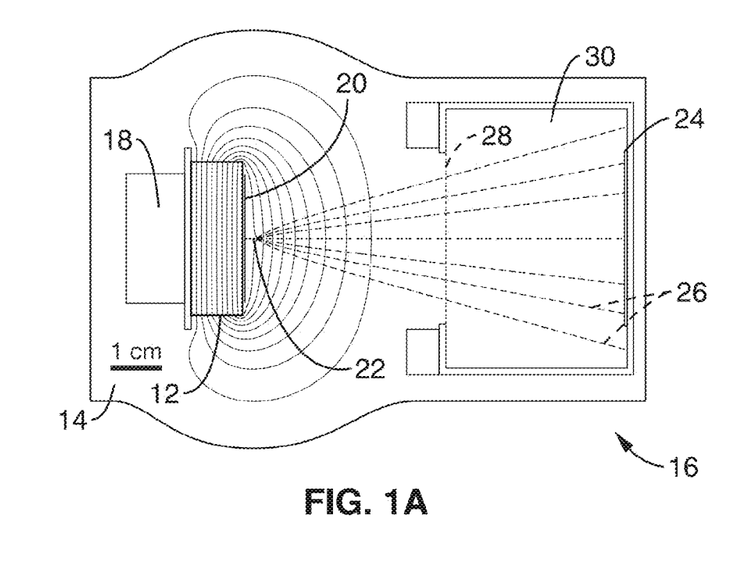
FIG. 1A shows equipment geometry and $D^+$ trajectories according to the present invention.
Figure 1B:
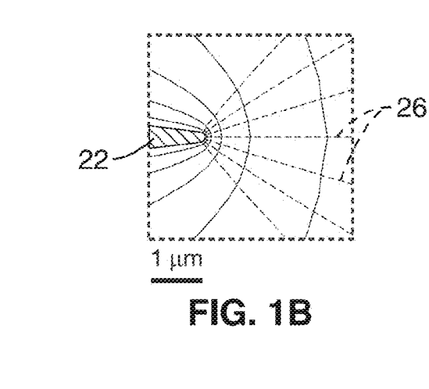
FIG. 1B shows the trajectories of FIG. 1A closer to the probe tip.

The vacuum chamber setup is shown in FIG. 1A. A cylindrical z-cut $LiTaO_3$ crystal 12 (diameter, 3.0 cm; height, 1.0 cm) was mounted inside a chamber 14 with negative axis facing outward onto a hollow copper block 16. A heater 18 is located adjacent the crystal 12. On the exposed crystal face, we attached a copper disc 20 (diameter, 2.5 cm; height, 0.5 mm), allowing charge to flow to a tungsten probe 22 (shank diameter, 80 μm; tip radius, 100 nm; length, 2.3 mm) (FIG. 1B). The probe geometry was chosen so that the tip field was approximately 25 V $nm^{-1}$ when the crystal face was charged to 80 kV. $D_2$ pressure was set using a leak valve and monitored with a $D_2$ compensated Pirani gauge. The target 24 was a molybdenum disc coated with $ErD_2$.

FIG. 1A also shows calculated equipotentials and $D^+$ trajectories 26 for a crystal charged to 100 kV; calculations were performed using finite-element methods. The grounded copper mesh 28 (85% open area, 19.8-mm wire) shields the Faraday cup 30. The cup 30 and target 24 are connected to a Keithley 6485 picoammeter and biased to +40 V to collect secondary electrons and help prevent avalanche discharges. FIG. 1B shows the same trajectories as in FIG. 1A, but near the tip 22. Using a shorter tip reduces the beam's angular spread.

The neutron detector (not shown) consists of six liquid scintillator (BC-501A and NE213) cells (diameter, 127 mm; height, 137 mm), each optically coupled to a 127-mm Hamamatsu R1250 photomultiplier tube (PMT). One output of each PMT was fed into a logical OR trigger, while the other output was fed into two Acqiris DC270 8-bit (1 gigasample per second) 4-channel digitizers configured as a single 8-channel digitizer. For every trigger, a 650-ns waveform was digitized simultaneously on all channels and written to disk for later analysis. To better resolve the bremsstrahlung endpoint, a 2.5-cm aluminium filter was placed between the X-ray detector and the viewport. The vacuum chamber's thick stainless steel walls and lead sheet shielded the neutron detector from X-rays.

Figure 2A:
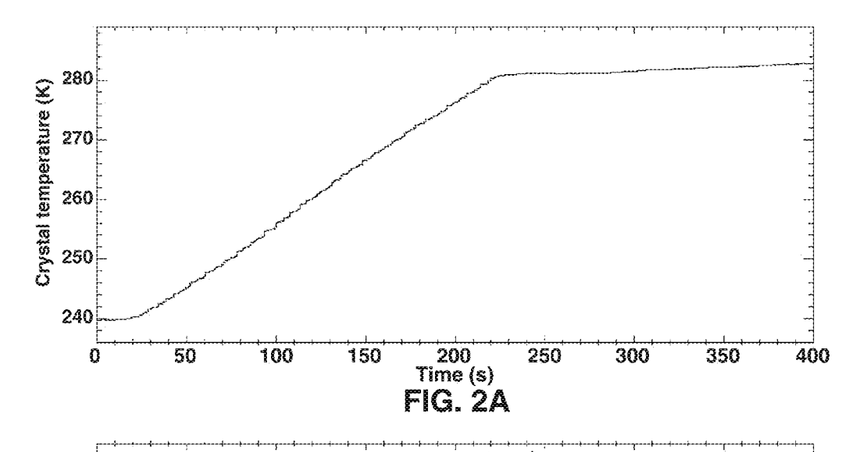
FIG. 2A is a graph of crystal temperature versus time for a single experimental run according to the present invention.
Figure 2B:
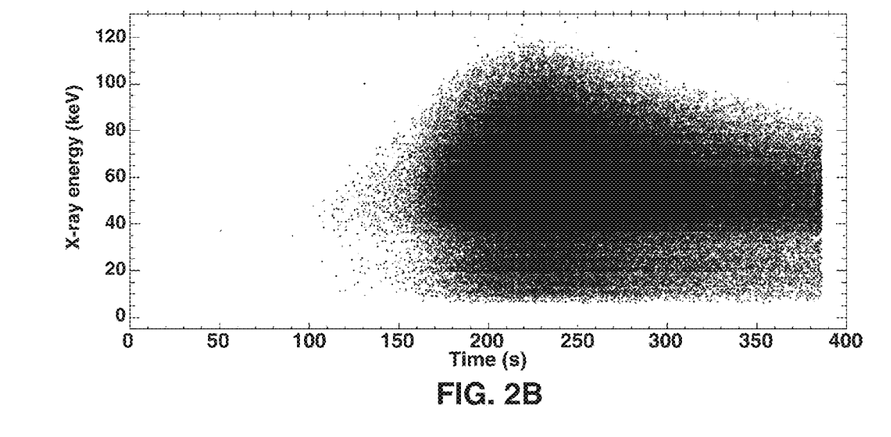
FIG. 2B is a graph of x-ray energy versus time for the experimental run shown in FIG. 2A.
Figure 2C:
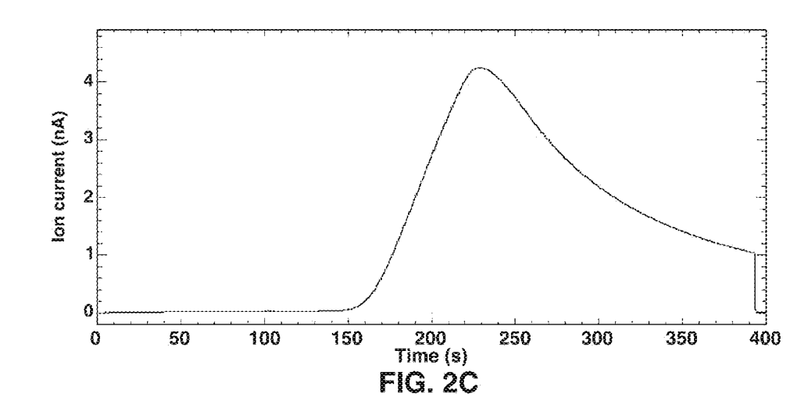
FIG. 2C is a graph of ion current versus time for the experimental run shown in FIG. 2A.
Figure 2D:
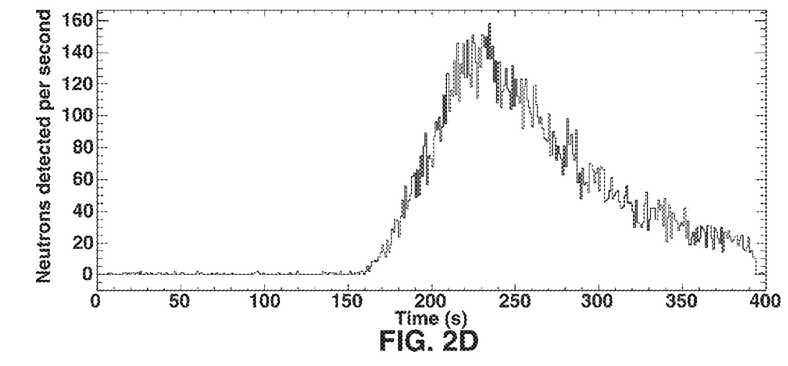
FIG. 2D is a graph of neutrons detected versus time for the experimental run shown in FIG. 2A.

A typical run is shown in FIG. 2A-2D. FIG. 2A shows the crystal temperature as a function of time. The heating rate was 12.4 K $min^{-1}$, corresponding to a pyroelectric current of 22 nA and a heating power of 2 W. FIG. 2B shows X-rays detected, FIG. 2C shows Faraday cup current, and FIG. 2D shows neutrons detected, each as a function of time, for the same run.

For the results shown in FIG. 2A-2D, the chamber's deuterium pressure was held at 0.7 Pa throughout the run. First, the crystal was cooled down to 240 K from room temperature by pouring liquid nitrogen into the cryogenic feedthrough. At time t=15 s, the heater was turned on. At t=100 s, X-ray hits due to free electrons striking the crystal were recorded. At t=150 s, the crystal had reached 80 kV and field ionization was rapidly turning on. At t=160 s and still not above 0° C., the neutron signal rose above background.

Ions striking the mesh and the surrounding aperture created secondary electrons that accelerated back into the crystal, increasing the X-ray signal. At t=170 s, the exponential growth of the ion current had ceased, and the tip was operating in the strong field regime, in which neutral molecules approaching the tip ionize with unity probability. The neutron flux continued to increase along with crystal potential until t=220 s, when we shut off the heater. Then, the crystal lost charge through field ionization faster than the reduced pyroelectric current could replace it, resulting in a steadily decreasing crystal potential. At t=393s, the crystal spontaneously discharged by sparking, halting the effect.

Figure 3A:
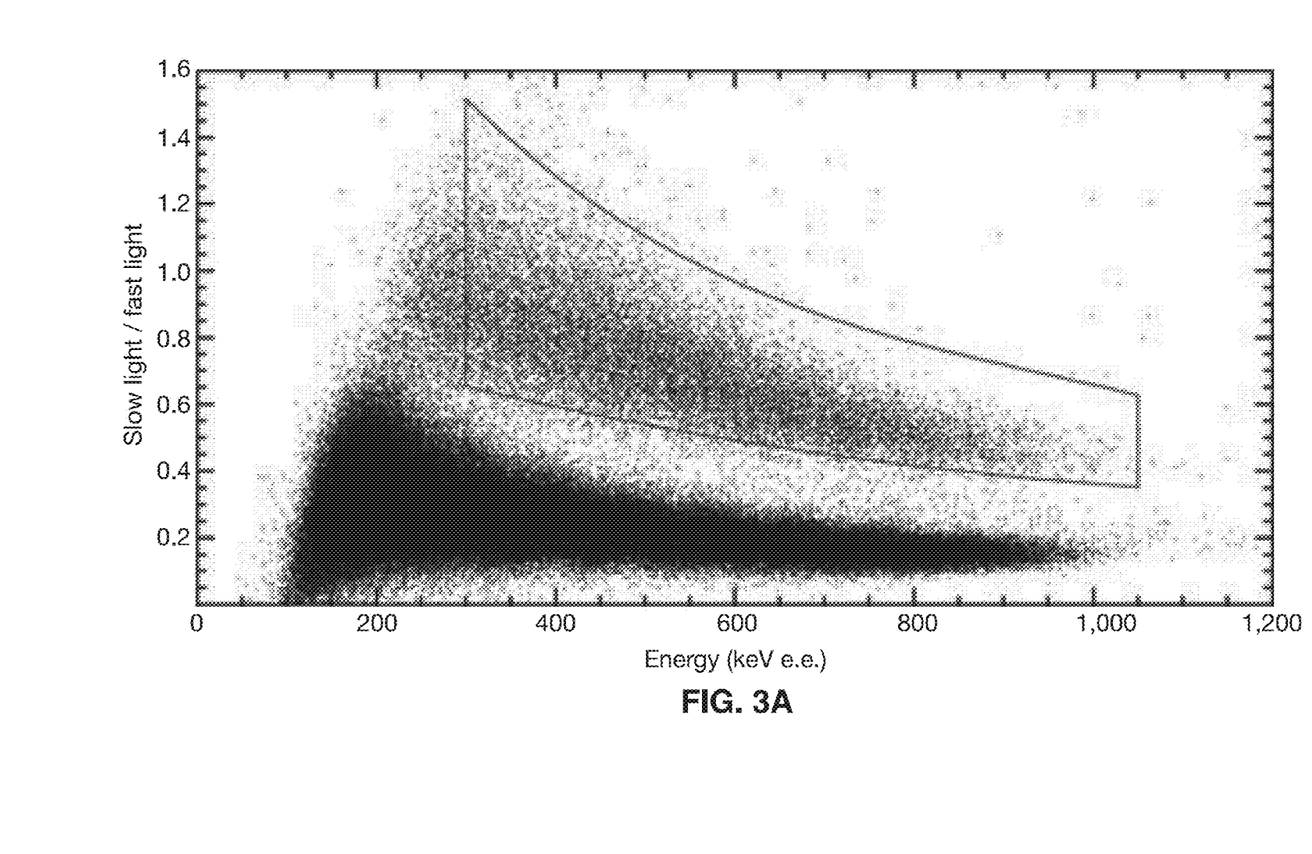
FIG. 3A is the pulse shape discrimination (PSD) spectrum for the experimental run shown in FIG. 2A.
Figure 3B:
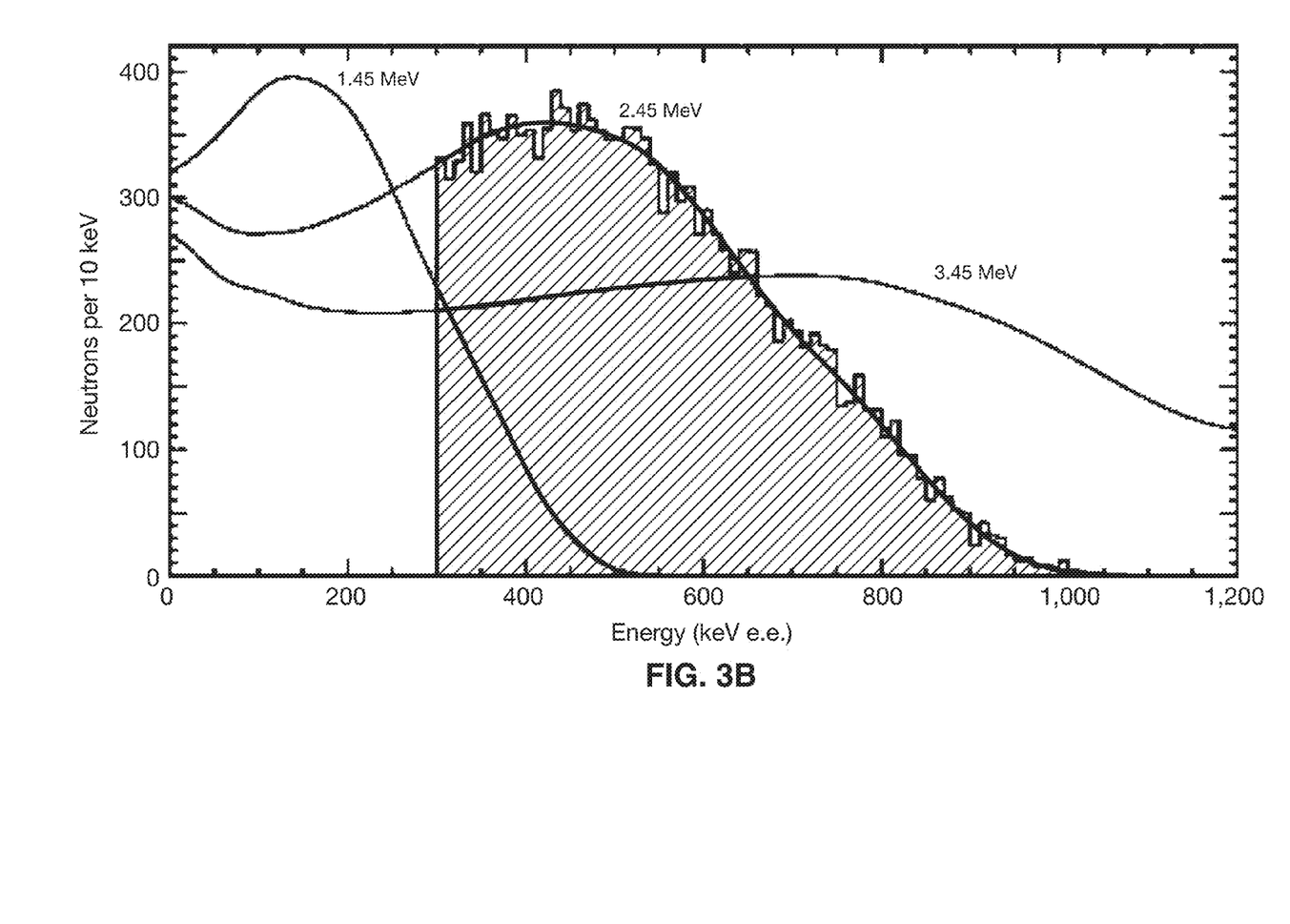
FIG. 3B is the proton recoil spectrum for the experimental run shown in FIG. 2A, in addition to simulated detector responses to neutrons having particular energies.

Pulse shape analysis and proton recoil spectroscopy of neutron detector data collected during the run are shown in FIG. 3A-3B. The energy scale, given in electron equivalent (e.e.) energy, was calibrated against Compton edges of a series of γ-ray sources and is proportional to anode charge.

FIG. 3A shows the pulse shape discrimination (PSD) spectrum. The PSD variable "slow light/fast light" is the ratio of integrated light in the tail of the PMT signal generated by an event in the liquid scintillator, to the integrated light around the signal's peak. Electron recoils are in the lower branch, and proton recoils, having longer scintillation decay, are in the upper branch. The events enclosed within the upper region are compared against tabulated pulse shapes, rejecting unusual events such as PMT double pulsing. There were a total of 15,300 valid neutrons over the course of the 400-s run. From the distribution of events, we estimate that the number of electron events leaking into the proton branch is negligible compared to the 1% cosmic background.

FIG. 3B shows the proton recoil spectrum. Valid neutron events are shown in histogram format. For comparison, we also show our detector's simulated responses to 1.45 MeV, 2.45 MeV and 3.45 MeV centre-of-mass boosted neutrons.

The majority of background triggers, as collected in the first 100 s of the run, have an electron recoil shape (900 counts per second) and are due to cosmic muons and γ-rays, compared with relatively few triggers having a proton recoil shape (33 counts in the first 100 s). Correcting for our 18% 2.45-

MeV neutron detection efficiency, the observed peak neutron flux was 800 neutrons per second. We may compare this observed peak neutron flux to the neutron flux expected from the ion beam striking the ErD$_2$ target. At the time of peak neutron flux, the ion current was 4.2 nA and the accelerating potential, inferred from the bremsstrahlung endpoint, was 115 kV. Using tabulated stopping powers and fusion cross-sections, we calculate a neutron flux of 900 neutrons s$^{-1}$. This is a slight overestimate, because part of the ion beam struck outside the target and there was an oxide layer on the target.

Figure 4A:
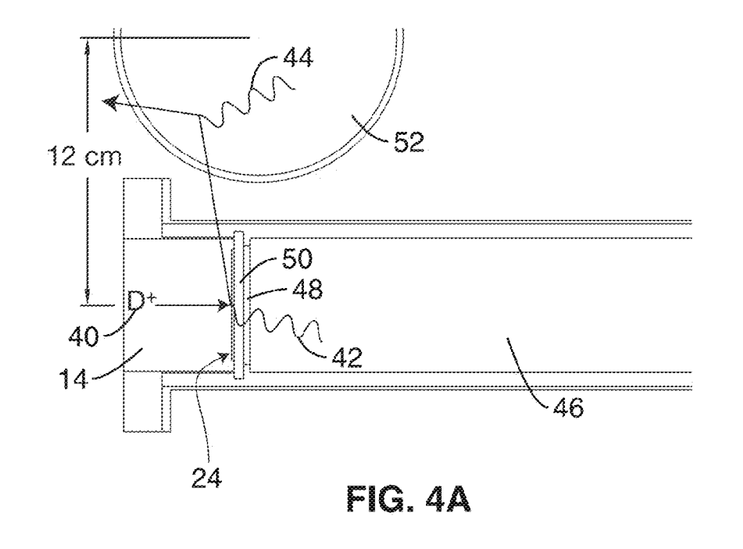
FIG. 4A is a depiction of the time-of-flight measurements according to the present invention.
Figure 4B:
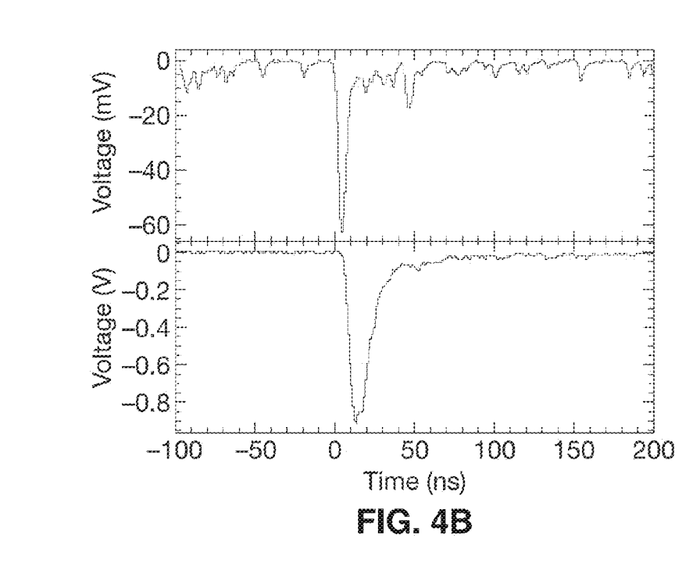
FIG. 4B are simultaneously captured PMT traces, demonstrating an α-particle-neutron coincidence, in the present invention.
Figure 4C:
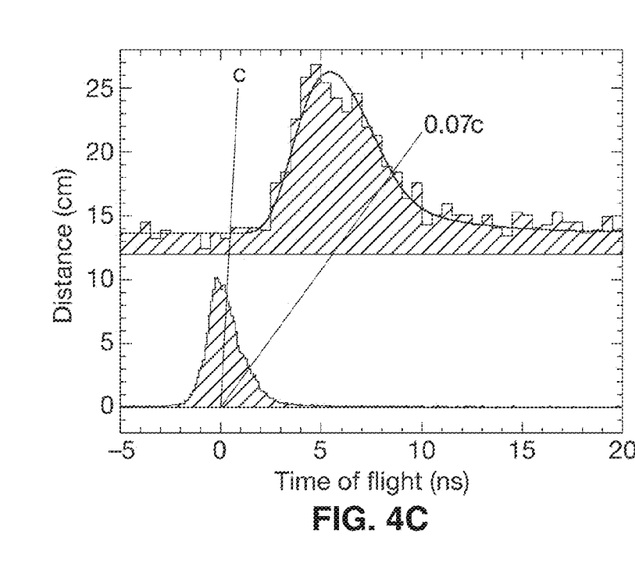
FIG. 4C are the time-of-flight results according to the present invention.

In FIG. 4A-4C, neutron time-of-flight measurements are presented as further evidence for this fusion reaction, demonstrating the delayed coincidence between the outgoing α-particle and the neutron. In FIG. 4A, a deuteron 40 is shown striking a thin disk of deuterated plastic scintillator 24, where it fuses with another deuteron, producing an 820-keV $^3$He 42 and a 2.45-MeV neutron 44. The α-particle 42 promptly scintillates in the plastic 24, recorded by a photomultiplier tube 46 coupled to the glass UHV viewport 48 through a silicone optical pad 50. The neutron 44, on the other hand, leaves the vacuum chamber 14, and is shown detected via proton recoil in the liquid scintillator 52.

FIG. 4B shows simultaneously captured PMT traces, demonstrating the α-particle-neutron coincidence. The plastic scintillator trace, shown in the upper panel, has a large α-particle hit at t=0 ns, whereas the smaller hits are incident deuterons that stopped in the plastic but did not fuse. The liquid scintillator trace, shown in the lower panel, has a proton hit at t=6 ns.

FIG. 4C shows time-of-flight results. The distribution of neutron flight times is shown in the upper histogram. As the neutron emission and detection volumes are finite and relatively closely spaced, we observe a range of flight times. The Monte Carlo flight time distribution, including a constant term to account for background, is shown fitted. The peak in the distribution roughly corresponds with the 5.6 ns it takes a 2.45-MeV neutron moving with a velocity of 0.07c (where c is the speed of light) to travel 12 cm. The relative timing offset between the two PMTs was calibrated using back-to-back 511-keV γ-rays from a $^{22}$Na source, as shown in the lower histogram.

Using deuterated plastic scintillator (BC-436) as both a deuterated target, and as a scintillation material, allowed us to pinpoint individual fusion events. The scintillator was mounted inside the chamber against a glass ultrahigh-vacuum (UHV) viewport, through which a Hamamatsu H1949-50 PMT was coupled via a silicone optical pad (FIG. 4B). The side of the scintillator facing the beam had a 50-nm layer of evaporated aluminium and was connected to the picoammeter. The aluminium prevented the target from charging up, allowed for a reliable beam current measurement, and helped screen out stray light originating from within the chamber. To minimize background hits, yet still collect valid coincidences, we used a reduced deuterium pressure and a reduced heating rate so that the ion current was around 10 pA. Running at this low level permitted prolonged runs. For example, the data shown in FIG. 4C were taken from a single heating cycle lasting over eight hours.

The present invention is not limited to the foregoing example, but can be enhanced by varying the included components. For example, the response of a crystal is preferably optimized by controlling the size, purity, conductivity, dielectric coefficient, chemical composition, mounting, and roughness. A matrix or mosaic of crystals may also be used in place of a single crystal. In this embodiment, these crystals would be grouped into an array that optimizes the field or current. A geometry can be preferably chosen that maximizes the electric field, or other desirable parameter. Laminated crystals can be used. Finally, all forms of piezoelectric crystals are appropriate, creating embodiments that include crystals in which stress and strain, rather than temperature, can be used to create fields for fusion.

The term "mounting" refers to the method used to attach the crystal to a heater, a cooler, or some other source of stimulus. The term also includes the technique used to fasten a tip or electrode to a crystal face. Examples include the use of conducting or non-conducting epoxy, vacuum glues, silver paint, or other mounting methods, such as clamping. An electrode is a surface that conditions the electric field generated by the crystal, and includes sheets, foils, or films of such materials as gold, aluminum, or tungsten. Other suitable metals can also be used.

The tip, as disclosed encompasses a region which has a sharp or a rounded edge whose radius of curvature ranges from microns to about 10 nanometers. A tip is not limited to merely a solid material, but can be made from a liquid, including, but not limited to, a gallium coating on a metal. In addition, an array of tips can be used to improve the yield.

Moreover, the overall environment, which includes, but is not limited to, the ambient temperature, humidity, and pressure, is variable as well.

Finally, applications using deuterated or tritiated systems are possible. In such applications, deuterium or tritium gas is introduced into the region of the crystal, or the hydrogen in the crystal is replaced with deuterium or tritium. Deuterium or tritium can also be adsorbed onto the crystal surface or loaded into the crystal. Gases and targets incorporating other elements that undergo nuclear reactions are also included in the present invention.

The value of any of these variables is preferably chosen to minimize or prevent unwanted internal and surface discharges (e.g., sparking). Alternatively, the crystal, if ruptured, compressed, or exploded, can also produce a fusion reaction.

Ultimately, the choice design parameters of the entire system takes all these variables into account. The parameters include, but are not limited to, the strength and spatial dependence of the electric field, the localization of the electric field, the current of ions and electrons emitted, and the energy and quantity of x-rays generated by the crystal with various mountings, tips, and stimuli.

Although the reported fusion is not useful in the power-producing sense, we anticipate that the system will find application as a simple palm-sized neutron generator. We note that small (about centimetre-sized) pyroelectric crystals can produce ion beams of sufficient energy and current to drive nuclear fusion. We anticipate increasing the field ionization current by using a larger tip, or a tip array, and by operating at cryogenic temperatures. With these enhancements, and in addition using a tritiated target, we believe that the reported signal could be scaled beyond 10$^6$ neutrons s$^{-1}$. Pyroelectric crystals may also have applications in electrostatic fusion devices, such as the Farnsworth fusor, and as microthrusters in miniature spacecraft. Applications also include use as a compact focused ion generator for the front end of a neutron camera in associated particle imaging (API).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for producing a neutron flux, comprising:
   locating a probe tip adjacent a pyroelectric crystal within a chamber;
   evacuating said chamber of ionizable gases;
   introducing a gaseous source of ions of deuterium within said chamber;
   changing the temperature of said pyroelectric crystal in the chamber containing the gaseous source of deuterium ions;
   wherein changing the temperature of said pyroelectric crystal produces an ion beam about said probe tip by field ionization of said gaseous source of deuterium ions; and
   positioning a deuterated target in a trajectory of said ion beam;
   wherein contact between said ion beam and said deuterated target produces a neutron flux.

2. The method as recited in claim 1, further comprising cooling said pyroelectric crystal before heating the pyroelectric crystal.

3. The method as recited in claim 1, further comprising locating a plurality of probe tips adjacent to at least one pyroelectric crystal within said chamber.

4. The method as recited in claim 1, wherein said gaseous source of ions comprises tritium gas.

5. The method as recited in claim 1, wherein the target comprises a tritiated target.

6. The method as recited in claim 1, wherein said pyroelectric crystal comprises lithium tantalate.

7. A method for producing a neutron flux, comprising:
   locating an array of a plurality of pyroelectric crystals with adjacent probe tips within a chamber;
   cooling said pyroelectric crystals;
   evacuating said chamber;
   introducing a gaseous source containing deuterium ions within said chamber;
   heating said pyroelectric crystals in the chamber containing the gaseous source of deuterium ions;
   wherein heating said pyroelectric crystals produces an ion beam about said probe tips by field ionization; and
   positioning a deuterated target in a trajectory of said ion beam;
   wherein contact between said ion beam and said deuterated target produces a neutron flux.

8. The method as recited in claim 7, wherein said gaseous source of ions comprises tritium gas.

9. The method as recited in claim 7, wherein said pyroelectric crystals comprises lithium tantalate.

10. A method for producing a neutron flux, comprising:
    locating an array of a plurality of pyroelectric crystals with adjacent probe tips within a chamber;
    cooling said pyroelectric crystals;
    evacuating said chamber;
    introducing a gaseous source of deuterium ions within said chamber;
    heating said pyroelectric crystals in the chamber containing the gaseous source of deuterium ions;
    wherein heating said pyroelectric crystals produces an ion beam about said probe tips by field ionization; and
    positioning a tritiated target in a trajectory of said beam;
    wherein contact between said beam and said tritiated target produces a neutron Flux.

* * * * *

UNITED STATES PATENT AND TRADEMARK OFFICE
CERTIFICATE OF CORRECTION

PATENT NO. : 8,396,181 B2  
APPLICATION NO. : 11/745556  
DATED : March 12, 2013  
INVENTOR(S) : Brian Naranjo Page 1 of 1

It is certified that error appears in the above-identified patent and that said Letters Patent is hereby corrected as shown below:

Specification

In Column 1, line 17, Delete

"This invention was made with Government support under Grant No. DMR 0309886, awarded by the National Science Foundation and Grant Nos. N00014-03-1-07 and N00014-04-1-07, awarded by the Department of Defense. The Government has certain rights in this invention."

Insert

-- This invention was made with Government support under N00014-03-1-0762, awarded by the Office of Naval Research, and under DMR0309886, awarded by the National Science Foundation. The Government has certain rights in the invention. --

Signed and Sealed this  
Twenty-eighth Day of June, 2016

Michelle K. Lee  
*Director of the United States Patent and Trademark Office*